Dec. 27, 1955  B. W. HERRMAN  2,728,223
WEB TENSION MEASURING APPARATUS
Filed May 24, 1952  2 Sheets-Sheet 1
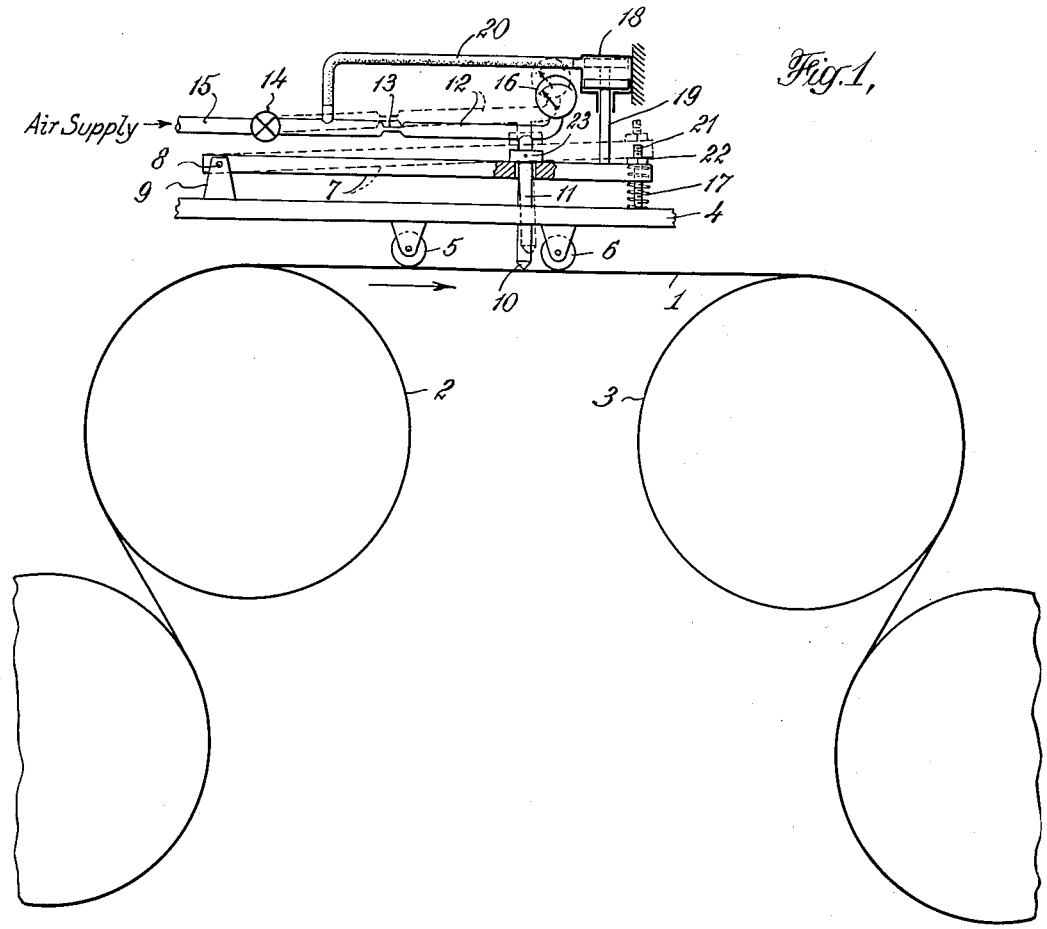
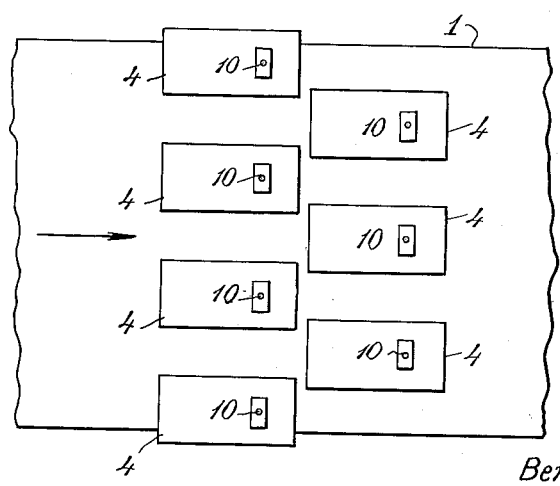
INVENTOR
Bernard W. Herrman
BY
Pennie, Edmonds, Morton, Barrows
ATTORNEYS

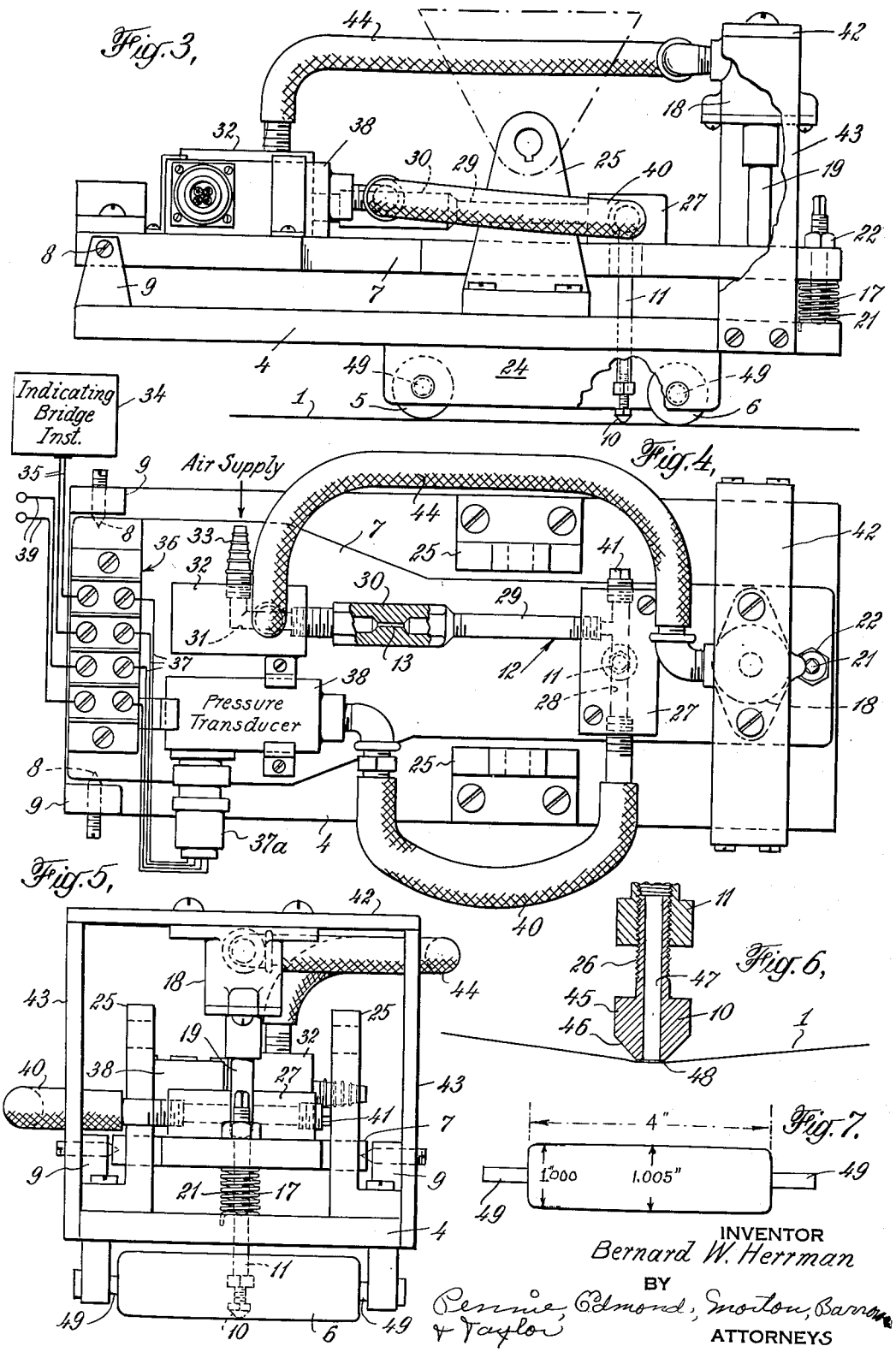

United States Patent Office 2,728,223
Patented Dec. 27, 1955

2,728,223

WEB TENSION MEASURING APPARATUS

Bernard W. Herrman, Hamilton, Ohio, assignor to The Champion Paper & Fibre Company, Hamilton, Ohio, a corporation of Ohio Application May 24, 1952, Serial No. 289,855

11 Claims. (Cl. 73—144)

This invention relates to apparatus for measuring the tension of a web of paper or other flexible sheet material.

There are many situations in which it is necessary or desirable to measure the tension on a web of paper or other flexible material, and in some instances it is desirable to measure the tension on a moving web of this nature. Thus for example, in the manufacture of paper, the web both expands and shrinks at different points in the course of its travel through the paper making machine, and it is desirable that the tension imposed upon the web at different points in its progress through the machine be accurately determined and, if necessary, regulated to avoid either tearing or unduly stretching the web due to excess tension, or improper feeding of the web due to too little tension thereon.

It is an object of the present invention to provide improved apparatus for accurately measuring the tension on a web of paper or other flexible material while the web is extended in a span between two supports and more particularly to provide apparatus of this nature which is capable of measuring web tension with a high degree of accuracy while the web is either stationary or is running, and without marking or other injury to the web.

A further object of the invention is the provision of web tension measuring apparatus capable of measuring the tension of a running web at a plurality of relatively localized points which may be distributed across the width of the web, whereby the area of maximum tension and in fact any unevenness in tension transversely of the web may be detected and measured.

According to the present invention, a pair of rotatably mounted rollers is arranged so that the rollers will engage the web of which the tension is to be measured at points which are spaced only a few inches apart, as mentioned in greater detail below. A nozzle having a single orifice is disposed closely adjacent the path of the web engaging these rollers, the axis of the nozzle being approximately normal to the surface of the web. These rollers prevent the lateral vibration of the web which may tend to occur from any cause, and which is particularly noticeable in a web which is traveling between two guide or feeding rolls that are spaced some distance apart. An air supply duct is connected to the nozzle and in this duct ahead of the nozzle a restricted orifice is arranged, the area of which is appreciably smaller than the area of the nozzle orifice, it being desirable that the area of the nozzle orifice be not less than about four times the area of the restricted orifice in order that when the nozzle is withdrawn from the web, most of the pressure drop will be across the orifice rather than at the nozzle. A value of about 4 or 5 to 1 has been found satisfactory for this ratio.

A source of air under pressure is connected to the air supply duct. Any suitable instrument is provided for measuring and indicating the pressure of the air in the supply duct between the restricted orifice and the nozzle. The web may be either horizontal or vertical. The surface of the web serves to partially close the nozzle orifice thereby raising the pressure within the air supply duct and, with the tip of the nozzle properly adjusted with respect to the path of the web, the variation in the distance of the web from the nozzle caused by change in the tension on the web will be reflected in a variation of the pressure indicated; the tighter the web, the higher the air pressure and the slacker the web, the lower the air pressure. Accordingly, this variation in pressure may be taken as a measure of the variation in the web tension. In fact, the pressure indicating instrument may be calibrated to read in web tension.

The web tension is measured in a localized area within approximately 1½ inches of the nozzle. The two rollers may extend across the full width of the web, in some cases, while in others it has been found advantageous to use rollers only long enough to engage the web across the full width of such localized area. For example, satisfactory results have been obtained with rollers about 4 inches in length and spaced about 4 inches apart. Furthermore, in order to take full advantage of the invention, the nozzle should be placed substantially nearer to one of the rollers than the other, and in a preferred embodiment may be about three times as far from the axis of one of the rollers as from the axis of the other of these rollers, especially in measuring the tension of moving webs, and, in addition, the nozzle should have a single, sharp edged orifice. These factors have been found to be important, the one tending to increase the sensitivity of tension measurement, particularly when the web is under light tension, and the other eliminating a tendency of the web to flutter against the nozzle.

Inasmuch as it is important, particularly when measuring the tension of certain webs, such for example, as a web of coated paper, to avoid scratching or marring the surface of the web, the invention also includes the mounting of the orifice on a support which is movable toward and away from the surface of the web, suitable means being provided to retract the nozzle from the surface of the web when the air pressure is cut off, and a pressure responsive device being connected to the air duct ahead of the restricted orifice, and also operatively connected to the nozzle, to move it toward the path of the web when the air pressure is applied.

Inasmuch as the tension may vary considerably across the width of a wide web, and because variation in the tension in local areas across the web may require correcting in order to preserve the condition of the web, as in a paper machine, the invention also includes the arrangement of a plurality of these single orifice nozzles laterally or cross-wise of the web so as to measure independently the tension variation, in a series of localized areas cross-wise of the web.

The following detailed description of the invention in connection with the accompanying drawings will afford a better understanding of the invention. In these drawings:

Fig. 1 is a diagrammatic representation of the apparatus of the invention applied to a web of paper as it leaves the first dryer section of a paper making apparatus;

Fig. 2 is a diagrammatic plan view showing a series of seven of the tension measuring devices of the invention mounted in staggered relation cross-wise of a wide web;

Fig. 3 is a view in side elevation of the improved tension measuring apparatus;

Fig. 4 is a plan view of the apparatus, as shown in Fig. 3;

Fig. 5 is an end elevation of the same apparatus;

Fig. 6 is a vertical detail section of the nozzle; and

Fig. 7 is a detail side view of one of the rollers.

Referring now to Fig. 1 of the accompanying drawings, the web 1 is a web of paper from a dryer section of a paper making machine and as it passes around a series of drums in its travel towards a further dryer section, the web moves horizontally between two of these drums 2 and 3. One of the tension measuring units of the present invention is shown mounted above this horizontal passage of the web. The unit also may be mounted below the horizontal web or on one side of a vertical or slanting web. The apparatus comprises a support 4, which has, rotatably mounted below it, two rollers 5 and 6. Support 4 is mounted on the machine frame, a portion of which is indicated by dot-and-dash lines in Fig. 3. Support 4 is so positioned that web 1 contacts the lower surfaces of these two rollers to cause them to be rotated by their engagement with the web. As shown in the drawings, the axes of rollers 5 and 6 lie in the same plane and are parallel to one another. Hence the rollers maintain the portion of web 1 which extends between them substantially flat and stable, preventing vibration or whipping of the web as it travels between drums 2 and 3.

Above support 4 a carriage 7 is arranged, which is pivoted at one end, as indicated at 8, between a pair of brackets 9 fixed to support 4. A nozzle 10 is mounted at the lower end of a tube 11, which is fixed to and projects downwardly from carriage 7 so as to place the nozzle in proximity to the upper surface of web 1 as it travels between rollers 5 and 6. Tube 11 forms a part of an air supply duct 12 for delivering air to nozzle 10, and disposed in this air supply duct there is a restricted orifice 13 to limit the flow of air. Beyond this there is a valve 14 by which the flow of air to nozzle 10 from a supply pipe 15 can be cut off.

The area of the orifice of nozzle 10 is at least four times the area of the restricted orifice 13 so that with the nozzle 10 lifted away from the web 1 to allow free flow of air through the system, the static pressure within air supply duct 12 will be only slightly above atmospheric pressure. When nozzle 10 is brought into proximity to the surface of web 1 the pressure within air supply duct 12 will rise somewhat, and the arrangement is such that the variation in this pressure corresponds to the variation in the tension in web 1 in the vicinity of the nozzle. This pressure, and the variation thereof, within air supply duct 12 is shown by means of a pressure indicator 16, which is connected to duct 12. That is to say, the amount of air escaping between the nozzle and the surface of the web varies with the web tension, and the air pressure within the nozzle varies with the amount of air escaping, such pressure variation being shown by the pressure indicator 16.

In order to prevent the end of nozzle 10 from making contact with the surface of web 1, which might result in marking or otherwise damaging such surface, pivoted carriage 7 is arranged so as to retract the nozzle from the web when control valve 14 is closed and the supply of air is shut off, in other words, when the tension measuring apparatus is not in operation. To this end a compression spring 17 is arranged at the opposite end of carriage 7 from pivot 8, which tends to raise or retract carriage 7 and nozzle 10 upwardly away from support 4 and web 1 as indicated by the dotted lines in Fig. 1. To move the carriage and nozzle 10 downwardly to operating position when the air supply is turned on, a pressure responsive device, such as the air cylinder 18, is provided.

The piston rod 19 of this device is arranged to engage at its lower end the pivoted carriage 7, and the chamber of cylinder 18 above the piston is connected by means of a conduit 20 to air supply duct 12 in advance of the restricted orifice 13. The arrangement is such that when valve 14 is opened the piston of air cylinder 18 moves pivoted carriage 7 downwardly against the action of spring 17, such movement of the carriage being stopped by an adjustable stop screw 21 having a lock nut 22 at its upper end. When first placing the device in operation, the position of nozzle 10 with respect to the surface of web 1 may be adjusted in any suitable way, for example, by means of stop screw 21, or by loosening a screw 23 which clamps supporting tube 11 in position.

It will be understood that nozzle 10 is adjusted so that its orifice is close to the normal path of web 1. The nozzle orifice may even extend somewhat beyond the normal web path, but in any such adjusted position, the air emerging from the nozzle holds the web out of actual contact with the nozzle. The nozzle orifice is in any case sufficiently close to the web so that the partial closure of the orifice by the web will substantially raise the pressure within air duct 12 above the pressure existing in this duct before the nozzle was brought into proximity to the web.

It will be understood that the single nozzle 10 of the tension measuring unit described reflects such variation in tension of the web as occurs in the immediate vicinity of the nozzle, that is to say, in a localized area of the web. In the arrangement shown in Fig. 2, a series of seven of these tension measuring units, each designated by a rectangle representing its support 4, and each having its own individual nozzle 10, is arranged in staggered relation across the width of the web. This results in measuring the variation in tension in seven localized areas stretching across the width of the web. It will be understood that the supports 4 may be placed side by side across the web, or they may be placed so as to bring the localized measured areas closer to one another by increasing the number of tension measuring units and staggering them more.

Referring now to Figs. 3-5, there is here illustrated a form of the apparatus which has been worked out and employed in measuring the tension in a web of paper. The support 4 is a substantially rigid rectangular plate having a pair of brackets 24 projecting from the bottom to support the two rollers 5 and 6. At its left end are the two brackets 9, which are provided with adjustable conical pivot screws constituting the pivots 8 previously referred to. Support 4 is itself rigidly mounted upon the machine carrying web 1 by means of a pair of L-shaped bracket members 25, which are attached by screws or otherwise to the upper surface of support 4.

Pivoted carriage 7 occupies the full space between brackets 9 at its pivot end, but is narrowed about midway so as to pass between the two mounting brackets 25. The nozzle 10 has an elongated stem 26 which is threaded into the lower end of supporting tube 11 and affords the means for adjusting the nozzle with respect to the surface of web 1, instead of the collar 23 diagrammatically indicated in Fig. 1. Supporting tube 11 projects downwardly from a block 27 into which the tube is threaded to connect with a drilled passage 28 (Fig. 4). Passage 28 is connected through a pipe 29 and a short drilled passage at right angles to passage 28 to the restricted orifice 13.

These several ducts collectively constitute the air supply duct 12, previously referred to. Orifice 13 consists of a small drilled passageway in a metallic connection 30 and the left hand end of which is connected to a threaded passage 31 in a second block 32, which is mounted on the upper surface of pivoted carriage 7 near pivots 8. A connection 33 for the air supply hose projects laterally from block 32.

In place of the pressure indicator 16 of Fig. 1, an electrically operated pressure indicator, which is indicated diagrammatically by the rectangle 34 is used. Any suitable instrument may be employed, such as one including a Wheatstone bridge circuit. Electrical conductors 35 lead from instrument 34 to a connection block, indicated generally by numeral 36, and thence through conductors 37 to the terminal 37a of a pressure transducer 38. This is a device having an electrical circuit, the electrical resistance of which varies with the fluid pressure applied to the fluid pressure responsive member of the transducer. The electrical supply conductors are indicated at 39. The fluid pressure responsive member of pressure transducer 38 is connected to air supply duct 12 by means of a flexible tube 40, which is connected to the outer end of the drilled passage 28 in block 27. The opposite end of this drilled passage is closed by a plug 41.

The compression coil spring which tends to lift pivoted support 7 and retract nozzle 10 away from the web 1, is shown at 17 at the right end of the unit; also, the adjustable stop 21 and lock nut 22. The piston rod 19 of air cylinder 18 is connected in any suitable way to the upper side of carriage 7 near stop screw 21. The air cylinder is carried on the underside of a cross piece 42, which is supported at its ends by two upright bars 43 secured to the opposite side edges of support 4 and projecting upwardly therefrom. The air connection to the upper end of cylinder 18 is through a flexible tube 44 from an inlet connection on block 32.

Referring again to Fig. 6 showing the details of nozzle 10, the nozzle head is preferably enlarged so as to have a flat sided, and preferably hexagonal area 45 to receive an adjusting wrench. It is important that the end of the nozzle be relieved as at 46, so that the outside diameter of its operating annular end 48 is little if any larger than its inside diameter, in order to reduce the area of the annular face of the nozzle, since, if this annular area generally parallel to the paper web is of substantial extent, the air stream from the nozzle tends to cause objectionable fluttering and vibration of the web, and instability of the reading.

Fig. 6 also shows to a greatly exaggerated degree a modified position of the nozzle beyond the normal pass line of web 1. The extent of the exaggeration is apparent when it is considered that the proper distance of the nozzle tip from the paper is about .016 inch, and from the fact the web is moved out of its normal pass line solely by the air stream emerging from the nozzle.

While the two rollers 5 and 6, one on either side of the nozzle 10, may be straight cylindrical rollers, in order to take full advantage of the invention, improving sensitivity of measurement when operating on a moving web, these rollers are advantageously slightly crowned, that is, somewhat thicker at their longitudinal centers than at their ends and taper uniformly from the center to each end. For example, using rollers which are 1 inch in diameter at their ends, the diameter at the center should be 1.005 inches, that is, five one-thousandths of an inch larger. These rollers are approximately four inches in length and are provided with trunnion bearings 49, which rotate in apertures in the two supporting brackets 24. The rollers, whether or not crowned, are provided with rounded ends to prevent marking the paper.

It will be understood that the above constitutes a description of the best form of the improved web tension measuring apparatus which I have devised, but that this is to be considered as an exemplifying disclosure of the invention and that changes may be made in the construction and arrangement of the various parts without departing from the invention, the scope of which is set forth in the accompanying claims.

I claim:

1. Apparatus for measuring the tension of a flexible web comprising, in combination, a pair of closely spaced parallel web stabilizing members disposed in a common plane and engaging the web of which the tension is to be measured substantially in the path of travel of said web and serving to maintain the portion of the web extending between said stabilizing members in substantially flat and laterally stable condition, a nozzle the axis of which is arranged substantially at right angles to the surface of said web, said nozzle having a single orifice disposed substantially in the plane of said stabilizing members and closely adjacent the surface of said web between said members, an air supply duct connected to said nozzle, there being a restricted orifice of appreciably smaller area than said nozzle orifice disposed in said air supply duct, means for supplying air under pressure to said air supply duct and means for measuring the pressure of air in said supply duct between said restricted orifice and said nozzle orifice.

2. Apparatus for measuring the tension of a flexible web comprising, in combination, a pair of closely spaced parallel web stabilizing members disposed in a common plane and engaging the web of which the tension is to be measured substantially in the path of travel of said web and serving to maintain the portion of the web extending between said stabilizing members in substantially flat and laterally stable condition, a nozzle the axis of which is arranged substantially at right angles to the surface of said web, said nozzle having a single orifice disposed substantially in the plane of said stabilizing members and closely adjacent the surface of said web between said members and more closely adjacent one of said members than the other, an air supply duct connected to said nozzle, there being a restricted orifice of appreciably smaller area than said nozzle orifice disposed in said air supply duct, means for supplying air under pressure to said air supply duct and means for measuring the pressure of air in said supply duct between said restricted orifice and said nozzle orifice.

3. Apparatus for measuring the tension of a flexible web comprising, in combination, a pair of closely spaced parallel web stabilizing members mounted in fixed position with respect to the web of which the tension is to be measured and substantially in the path of travel of said web, said members serving to maintain the portion of the web extending between them in flat stable condition, a nozzle the axis of which is arranged at substantially right angles to said web, said nozzle having an operating end forming a single orifice surrounded by a narrow annular face, said orifice being disposed substantially in the plane of said stabilizing members and closely adjacent the surface of the web between said members, an air supply duct connected to said nozzle, there being a restricted orifice of appreciably smaller area than said nozzle orifice disposed in said air supply duct, means for supplying air under pressure to said air supply duct, and means for measuring the pressure of air in said supply duct between said restricted orifice and said nozzle orifice.

4. Apparatus for measuring the tension of a flexible web comprising, in combination, a pair of web stabilizing rollers, means for mounting said rollers in parallel closely spaced and fixed position substantially in the path of travel of the web of which the tension is to be measured, said rollers maintaining the intermediate portion of said web in laterally stable and flat condition, a nozzle the axis of which is arranged at substantially right angles to said web, said nozzle having a single orifice surrounded by a sharp edge and disposed closely adjacent the normal path of the web between said rollers, an air supply duct connected to said nozzle, there being a restricted orifice of appreciably smaller area than said nozzle orifice disposed in said air supply duct, means for supplying air under pressure to said air supply duct and means for measuring the pressure of air in said supply duct between said restricted orifice and said nozzle orifice.

5. Apparatus for measuring the tension of a flexible web comprising, in combination, a pair of web stabilizing rollers, means for mounting said rollers in parallel closely spaced and fixed position substantially in the path of travel of the web of which the tension is to be measured, said rollers maintaining the intermediate portion of said web in laterally stable and flat condition, a nozzle disposed substantially normal to the plane of travel of said web between said rollers, said nozzle being disposed at a point more closely adjacent one of said rollers than the other, said nozzle having an operating end forming a single orifice surrounded by a narrow annular face, said face being disposed closely adjacent the normal path of the web engaging said rollers, an air supply duct connected to said nozzle, there being a restricted orifice of appreciably smaller area than said nozzle orifice disposed in said air supply duct, means for supplying air under pressure to said air supply duct and means for measuring the pressure of air in said supply duct between said restricted orifice and said nozzle orifice.

6. Apparatus for measuring the tension of a flexible web comprising, in combination, a pair of web stabilizing rollers, means for mounting said rollers in parallel closely spaced and fixed position substantially in the path of travel of the web whose tension is to be measured, said rollers being mounted in engagement with longitudinally spaced points on said web, said rollers maintaining the intermediate portion of said web in laterally stable and flat condition, a nozzle disposed substantially normal to the plane of travel of said web at a point between said rollers which is at least substantially three times as far from the contact point of one of said rollers with the web as it is from the contact point of the web with the other of said rollers, said nozzle having an operating end forming a single orifice surrounded by a narrow annular face, said face being disposed substantially in the plane of said stabilizing rollers an air supply duct connected to said nozzle, there being a restricted orifice of appreciably smaller area than said nozzle orifice disposed in said air supply duct, means for supplying air under pressure to said air supply duct and means for measuring the pressure of air in said supply duct between said restricted orifice and said nozzle orifice.

7. Apparatus for measuring the tension of a flexible web comprising, in combination, a pair of web stabilizing rollers, means for mounting said rollers in parallel closely spaced and fixed position in engagement with spaced points on the web of which the tension is to be measured, said rollers maintaining the intermediate portion of said web in laterally stable and flat condition, a nozzle projecting between said rollers, the axis of said nozzle being at substantially right angles to said web, said nozzle having a single orifice whose operating position is substantially in the plane of said stabilizing rollers, an air supply duct connected to said nozzle, there being a restricted orifice of an appreciably smaller area than said nozzle orifice disposed in said air supply duct, means for supplying air under pressure to said air supply duct, means for measuring the pressure of air in said supply duct between said restricted orifice and said nozzle orifice, automatic means responsive to the presence of air under pressure in said supply duct for moving said nozzle orifice into said operating position, and means acting in the absence of such pressure in said supply duct for retracting said nozzle orifice away from said position.

8. Apparatus for measuring the tension of a flexible web comprising, in combination, a pair of web stabilizing rollers, means for mounting said rollers in parallel closely spaced and fixed position in engagement with spaced points on the web of which the tension is to be measured, said points of engagement being disposed substantially in the path of travel of said web and said rollers maintaining the intermediate portion of said web in laterally stable and flat condition, a nozzle having a single orifice projecting between said rollers, the axis of said nozzle being at substantially right angles to said web, an air supply duct connected to said nozzle, there being a restricted orifice of an appreciably smaller area than said nozzle orifice disposed in said air supply duct, means for supplying air under pressure to said air supply duct, and means for measuring the pressure of air in said supply duct between said restricted orifice and said nozzle orifice, said rollers being slightly larger in diameter centrally than at their ends, and said nozzle orifice being disposed closely adjacent said web substantially in line with the crowns of said rollers.

9. Apparatus for measuring the tension of a flexible web while moving unsupported between two fixed carriers comprising, in combination, a pair of web stabilizing rollers, means for mounting said rollers in parallel closely spaced and fixed position substantially in the path of travel of said web, said rollers maintaining the intermediate portion of said web in laterally stable and flat condition, a nozzle the axis of which is arranged approximately at right angles to said web, said nozzle having a single orifice disposed closely adjacent the normal path of the web between said rollers, means for supplying air under pressure to said nozzle, and means for measuring the variation in air pressure in the nozzle due to variation in the amount of air escaping between the nozzle and the surface of said web.

10. Apparatus for measuring the tension of a flexible web as claimed in claim 9 wherein the stabilizing rollers are rounded at their ends and of length substantially less than the width of the web.

11. Apparatus for measuring the tension of a flexible web as claimed in claim 10 wherein a series of groups of stabilizing rollers and nozzles are ranged across the web, each group having its associated nozzle, and each nozzle having independent means for measuring variation in the air pressure therein so as to detect and measure any unevenness in tension transversely of the web.

References Cited in the file of this patent

UNITED STATES PATENTS

| | | |
|---|---|---|
| 2,100,653 | Umansky | Nov. 30, 1937 |
| 2,177,051 | Birmingham | Oct. 24, 1939 |
| 2,244,864 | Witham | June 10, 1941 |
| 2,295,399 | Hanna | Sept. 8, 1942 |
| 2,343,229 | Stone | Feb. 29, 1944 |
| 2,345,732 | Davies et al. | Apr. 4, 1944 |
| 2,398,958 | Pelletiere | Apr. 23, 1946 |
| 2,438,696 | Fox et al. | Mar. 30, 1948 |
| 2,455,285 | Versaw | Nov. 30, 1948 |
| 2,552,189 | Kuehni | May 8, 1951 |
| 2,605,101 | Lessmann | July 29, 1952 |